(12) United States Patent
Alvarez et al.

(10) Patent No.: US 9,062,792 B2
(45) Date of Patent: Jun. 23, 2015

(54) MULTIPLE COIL SOLENOID VALVE

(75) Inventors: Raphael Alvarez, Geneva (CH); Nicolas Deperraz, Bons en Chablais (FR); Pierre Sirdey, Geneva (CH)

(73) Assignee: Fluid Automation Systems SA, Versoix (CH)

( * ) Notice: Subject to any disclaimer, the term of this patent is extended or adjusted under 35 U.S.C. 154(b) by 474 days.

(21) Appl. No.: 13/394,184

(22) PCT Filed: Sep. 20, 2010

(86) PCT No.: PCT/EP2010/005744
§ 371 (c)(1),
(2), (4) Date: Mar. 5, 2012

(87) PCT Pub. No.: WO2011/032724
PCT Pub. Date: Mar. 24, 2011

(65) Prior Publication Data
US 2012/0161049 A1 Jun. 28, 2012

(30) Foreign Application Priority Data

Sep. 18, 2009 (FR) ...................................... 09 56438

(51) Int. Cl.
*F16K 31/06* (2006.01)

(52) U.S. Cl.
CPC ....... *F16K 31/0679* (2013.01); *Y10T 29/49405* (2015.01); *F16K 31/0627* (2013.01); *F16K 31/0651* (2013.01); *F16K 31/0655* (2013.01)

(58) Field of Classification Search
CPC ............ F16K 31/0627; F16K 31/0651; F16K 31/0655; Y10T 29/49405
USPC ......... 137/625.65; 251/129.09; 335/136, 127, 335/267, 266, 268, 256
See application file for complete search history.

(56) References Cited

U.S. PATENT DOCUMENTS

| | | | | |
|---|---|---|---|---|
| 347,707 A | * | 8/1886 | Grovesteen | 251/129.09 |
| 456,685 A | * | 7/1891 | Wunderlich | 251/129.09 |
| 514,090 A | * | 2/1894 | Love | 251/129.09 |
| 802,945 A | * | 10/1905 | Waterman | 251/129.1 |
| 1,028,657 A | * | 6/1912 | Aubert et al. | 251/129.1 |
| 1,242,003 A | * | 10/1917 | Lewis | 251/129.1 |
| 2,550,297 A | * | 4/1951 | Ray | 251/129.09 |
| 2,687,870 A | * | 8/1954 | Matthews | 251/129.09 |
| 2,967,545 A | * | 1/1961 | Schmidt | 137/625.65 |
| 3,004,195 A | | 10/1961 | Peras | |
| 4,577,658 A | * | 3/1986 | Bosteels et al. | 251/65 |

(Continued)

FOREIGN PATENT DOCUMENTS

| | | | |
|---|---|---|---|
| DE | 29914633 U1 | | 10/1999 |
| EP | 1655465 A2 | | 5/2006 |
| WO | WO2005012697 | * | 2/2005 |

*Primary Examiner* — Craig Schneider
*Assistant Examiner* — Craig J Price
(74) *Attorney, Agent, or Firm* — The Ollila Law Group LLC (57) ABSTRACT

A multiple coil solenoid valve (100) is provided. The multiple coil solenoid valve comprises a first solenoid coil (101A) and at least a second solenoid coil (101B). One or more magnetic cores (210) are positioned at least partially between the first and second solenoid coils (101A, 101B). The multiple coil solenoid valve (100) also includes one or more movable armatures (211) movable between a first position and at least a second position. The one or more movable armatures (211) are positioned at least partially between the first and second solenoid coils (101A, 101B).

11 Claims, 5 Drawing Sheets

(56) References Cited

U.S. PATENT DOCUMENTS

| | | | |
|---|---|---|---|
| 4,664,355 A * | 5/1987 | Kubach | 251/65 |
| 4,682,135 A * | 7/1987 | Yamakawa | 335/256 |
| 5,029,807 A * | 7/1991 | Fuchs | 251/65 |
| 5,640,987 A * | 6/1997 | Sturman | 137/625.65 |
| 5,787,915 A * | 8/1998 | Byers et al. | 137/625.65 |
| 6,085,991 A * | 7/2000 | Sturman | 239/88 |
| 6,105,616 A * | 8/2000 | Sturman et al. | 137/625.65 |
| 6,199,587 B1 * | 3/2001 | Shlomi et al. | 137/625.5 |
| 6,267,351 B1 * | 7/2001 | Schneider | 251/129.1 |
| 6,279,594 B1 * | 8/2001 | Beitzel et al. | 137/1 |
| 6,496,092 B1 | 12/2002 | Schnatterer et al. | |
| 6,726,173 B2 | 4/2004 | Hettinger et al. | |
| 2002/0088956 A1 * | 7/2002 | Ozawa et al. | 251/129.01 |
| 2002/0145124 A1 * | 10/2002 | Kabasin et al. | 251/54 |
| 2003/0120157 A1 | 6/2003 | Fukui et al. | |
| 2004/0045539 A1 | 3/2004 | Furuta et al. | |
| 2004/0206922 A1 * | 10/2004 | Du Plessis et al. | 251/129.06 |
| 2008/0006791 A1 * | 1/2008 | Reinicke | 251/65 |

* cited by examiner

MULTIPLE COIL SOLENOID VALVE

TECHNICAL FIELD

The present invention relates to, solenoid valves, and more particularly, to a solenoid valve with multiple coils.

BACKGROUND OF THE INVENTION

Fluid handling devices are becoming increasingly popular and there is an increased demand for fluid handling devices that are both portable and easy to use. Portable fluid handling devices are being used for applications such as home care, point of care testing, fuel cells, fragrance dispensers, etc. Many designs rely upon solenoid actuated valves to control the fluid flow through the fluid handling device. Unfortunately, as a fluid handling device's size decreases, the performance of the solenoid actuated valve often decreases as well. Prior art fluid handling devices that rely upon solenoid actuated valves can often suffer with decreased size, thereby limiting the valve's ability to handle high fluid pressures/flow rates. One reason for this is that the single solenoid coil of many prior art designs produces a limited magnetic flux. Therefore, often in solenoid valves that include only a single coil, the movable armature that opens and closes the fluid path typically has a smaller cross-sectional area than the cross-sectional area of the solenoid coil assembly. Therefore, in order to increase the size of the movable armature, the size of the single coil is typically also increased. However, increasing the size of the coil is in direct conflict with the desire of decreasing the overall size of the fluid handling device, and therefore, may not be possible.

One design attempt to overcome the above mentioned problems is to provide more than one solenoid coil to actuate the valve. For a given valve width, two solenoid coils can generally generate more force than a single coil provided with the same width. Such a design is provided in several prior patents. For example, U.S. Pat. No. 6,726,173 provides a micro-valve that includes a yoke with two solenoid coils slipped on the two legs of the yoke. A rotary armature is provided below the yoke and thus, below the two solenoids. The rotary armature is used to open one of two fluid ports in order to direct fluid through the valve. Another example is provided in U.S. Pat. No. 6,496,092. The '092 patent is directed towards an electromagnetic valve with two solenoid coils positioned above a movable armature. The movable armature controls the flow through the 3/2 valve.

Although both of the above examples provide a double coil design in order to increase the available magnetic flux produced by the valve, neither design optimizes the increased magnetic flux of the valve. This is because in each of the above patents, the movable armature is positioned below the two solenoid coils. As a result, the armature is relatively distant from the coils. Therefore, only a portion of the magnetic flux created by the double coil design is realized by the movable armature. Consequently, while the solenoid coils have an increased magnetic flux output compared to a single coil design, the overall performances of the valves still suffer.

The present invention overcomes this and other problems and an advance in the art is achieved. The present invention repositions the movable armature between the solenoid coils so as to increase the force acting on the armature.

SUMMARY OF THE INVENTION

A multiple coil solenoid valve is provided according to an embodiment of the invention. The multiple coil solenoid valve comprises a first solenoid coil and at least a second solenoid coil. The multiple coil solenoid valve also includes one or more magnetic cores. According to an embodiment of the invention, the one or more magnetic cores are positioned at least partially between the first and second solenoid coils. According to an embodiment of the invention, the multiple coil solenoid valve also includes one or more movable armatures movable between a first position and at least a second position. The one or more movable armatures are positioned at least partially between the first and second solenoid coils.

A method for forming a multiple coil solenoid valve is provided according to an embodiment of the invention. The multiple coil solenoid valve includes a first solenoid coil and at least a second solenoid coil. According to an embodiment of the invention, the method includes the step of positioning one or more magnetic cores at least partially between the first and second solenoid coils. According to an embodiment of the invention, the method also includes the step of positioning one or more movable armatures at least partially between the first and second solenoid coils.

Aspects

According to an aspect of the invention, a multiple coil solenoid valve comprises:

a first solenoid coil;
at least a second solenoid coil;
one or more magnetic cores positioned at least partially between the first and second solenoid coils; and
one or more movable armatures movable between a first position and at least a second position, wherein the one or more movable armatures are positioned at least partially between the first and second solenoid coils.

Preferably, the multiple coil solenoid valve further comprises a removable cartridge, wherein the one or more magnetic cores and the one or more movable armatures are located within the removable cartridge.

Preferably, the multiple coil solenoid valve further comprises a sealing member and a fluid orifice.

Preferably, the multiple coil solenoid valve further comprises a fluid flow path formed in the one or more magnetic cores and the one or more movable armatures.

Preferably, the multiple coil solenoid valve further comprises one or more permanent magnets located in at least one of the first or second solenoid coils.

Preferably, the multiple coil solenoid valve further comprises a body coupled to the first and second solenoid coils and including a first fluid port and at least a second fluid port.

Preferably, the multiple coil solenoid valve further comprises a third fluid port formed in the body.

Preferably, each of the first and second solenoid coils comprises a first cross-sectional area and the one or more movable armatures comprises a second cross-sectional area, which is larger than the first cross-sectional area.

According to another aspect of the invention, a method for forming a multiple coil solenoid valve including a first solenoid coil and at least a second solenoid coil comprises the steps of:

positioning one or more magnetic cores at least partially between the first and second solenoid coils; and
positioning one or more movable armatures at least partially between the first and second solenoid coils.

Preferably, the one or more magnetic cores and the one or more movable armatures are located within a removable cartridge.

Preferably, the method further comprises the step of coupling a sealing member to the one or more movable armatures, with the sealing member being adapted to seal an orifice of the multiple coil solenoid valve.

Preferably, the method further comprises the step of forming a fluid flow path in the one or more magnetic cores and the one or more movable armatures.

Preferably, the method further comprises the step of positioning one or more permanent magnets in at least one of the first or second solenoid coils.

Preferably, the method further comprises the step of coupling a body to the first and second solenoid coils, wherein the body includes a first fluid port and at least a second fluid port.

Preferably, each of the first and second solenoid coils comprises a first cross-sectional area and each of the one or more movable armatures comprises a second cross-sectional area, which is larger than the first cross-sectional area.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
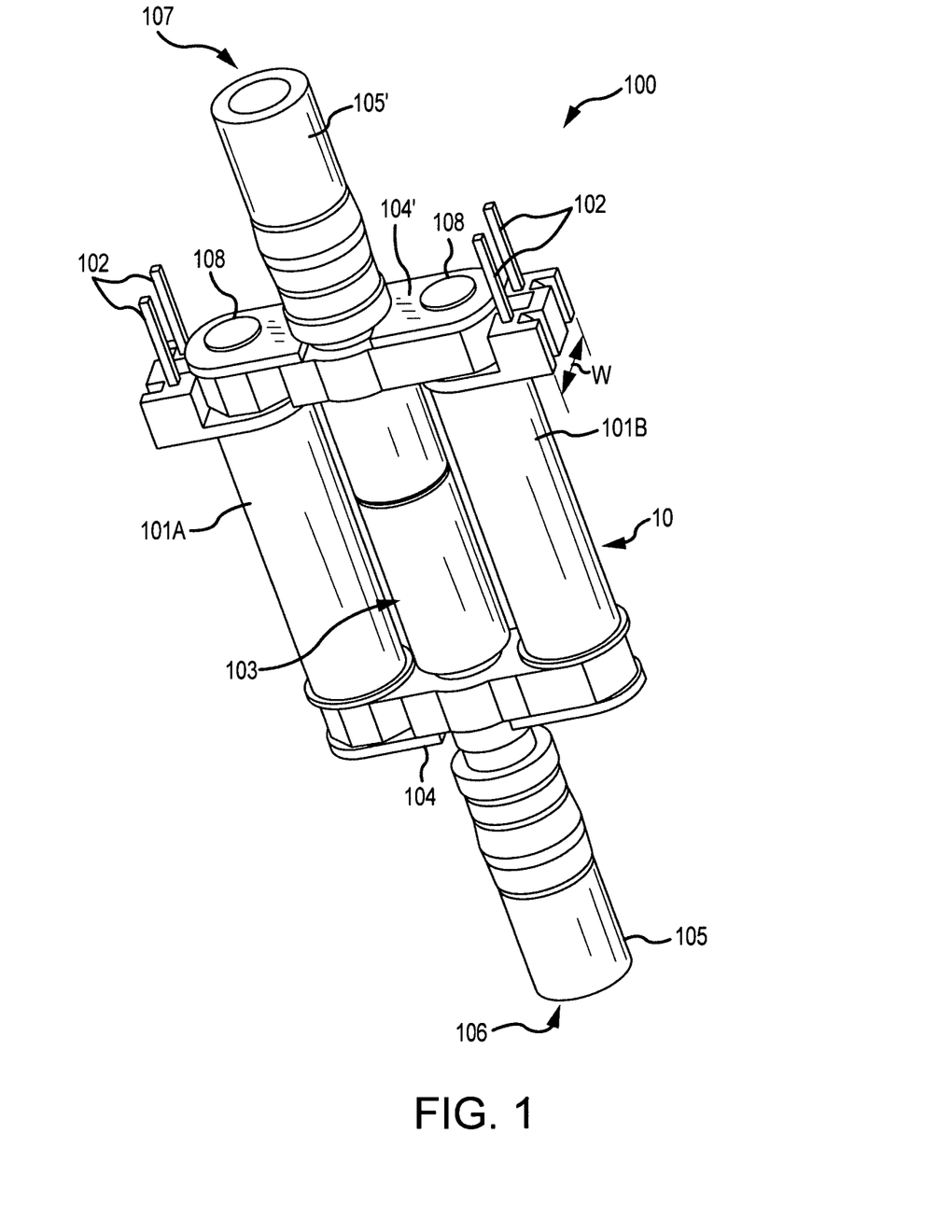
FIG. 1 shows a multiple coil valve according to an embodiment of the invention.

FIG. 1 shows a multiple coil valve 100 according to an embodiment of the invention. The valve 100 is shown in FIG. 1 with a base portion 10 and a removable cartridge 103 coupled together. It should be appreciated that the valve 100 may also include a case or other protective covering that is not shown in the figures in order to reduce the complexity of the drawing. According to an embodiment of the invention, the valve 100 comprises a solenoid actuated valve. In the embodiment shown, the base portion 10 includes a first coil 101A, a second coil 101B, one or more electrical contacts 102, and one or more cartridge receivers 104, 104'. While the present invention is shown in FIG. 1 and throughout the specification with only a first and a second coil, it should be appreciated that the present invention is not limited to two coils, but rather, the valve of the present invention may include more than two coils.

In the embodiment shown in FIG. 1, the valve 100 also includes a removable cartridge 103, which is discussed further below. According to an embodiment of the invention, the removable cartridge 103 can be coupled to a first conduit 105 at the first end 106 and a second conduit 105' at the second end 107. It should be appreciated that the first and second ends may comprise either the inlet or the outlet and therefore, the particular direction of fluid flow should not limit the scope of the present invention. It should be appreciated that only a portion of the conduits 105, 105' are shown; and in practice, the conduits 105, 105' may be much longer than illustrated.

The removable cartridge 103 may be removably coupled to the conduits 105, 105' or substantially permanently coupled to the conduits 105, 105'. In use, the valve 100 can be used to control the fluid delivery through the conduits 105, 105'.

According to an embodiment of the invention, the removable cartridge 103 is adapted to engage the one or more cartridge receivers 104, 104'. In the embodiment shown, two cartridge receivers 104 and 104' are shown, with one cartridge receiver 104 located proximate the first end 106 and the other cartridge receiver 104' being located proximate the second end 107. It should be appreciated that while two cartridge receivers 104, 104' are shown, the valve 100 may include a single cartridge receiver or more than two cartridge receivers. Therefore, the particular number of cartridge receivers should not limit the scope of the present invention. According to an embodiment of the invention, the cartridge receivers 104, 104' are positioned between the first and second coils 101A, 101B. According to an embodiment of the invention, the cartridge receivers 104, 104' are coupled to the first and second coils 101A, 101B. According to some embodiments, the cartridge receivers 104, 104' can also be used to retain the first and second coils 101A, 101B at a fixed distance and/or orientation from one another. The cartridge receivers 104, 104' may be coupled to the first and second coils 101A, 101B using fasteners 108, for example. The fasteners 108 corresponding to the first cartridge receiver 104 are not visible in the figures. It should be appreciated that while two coils 101A, 101B are shown, in other embodiments, more than two coils may be implemented. Therefore, the present invention should not be limited to two solenoid coils. According to an embodiment of the invention, the use of a multiple coil system, such as shown in the figures, allows the valve 100 to be utilized with higher flow rates/fluid pressures. This is because for a given valve width, W, two coils can provide a greater force than a single coil system. As a result, a larger fluid opening can be provided thereby allowing for a greater flow rate through the valve 100.

According to an embodiment of the invention, the coils 101A, 101B can be coupled to the electrical contacts 102. The electrical contacts 102 can be connected to a power supply (not shown) in order to operate the valve 100 by energizing the coils 101A, 101B. Operation of the valve 100 is described in more detail below.

Figure 2:
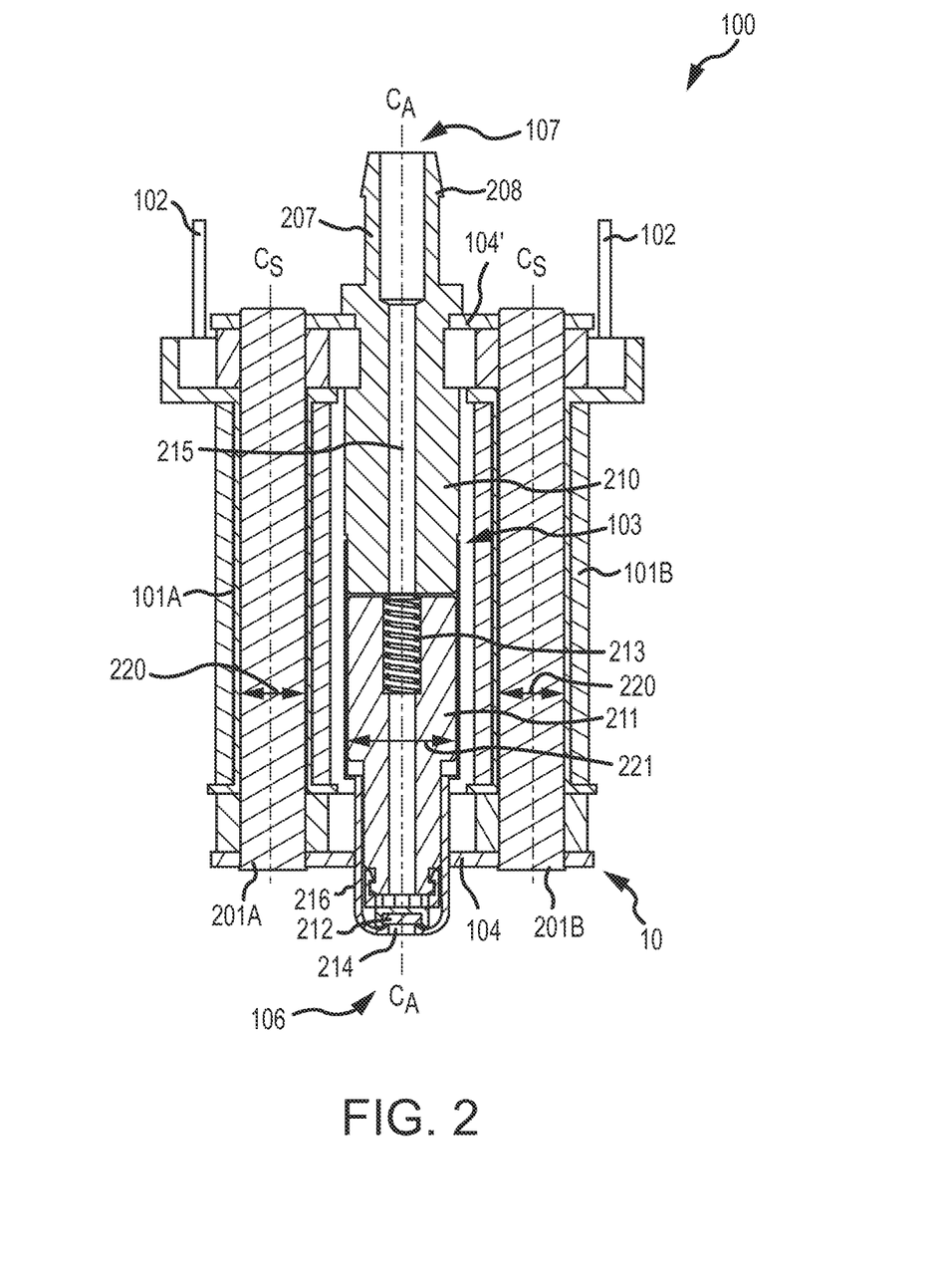
FIG. 2 shows a cross-sectional view of the multiple coil valve according to an embodiment of the invention.

FIG. 2 shows a cross-sectional view of the multiple coil valve 100 according to an embodiment of the invention. The conduits 105, 105' have been omitted from the valve 100 shown in FIG. 2. In addition to the components shown in FIG. 1, FIG. 2 also shows a magnetic core 210, a movable armature 211, a housing 216 in the form of a sleeve that substantially surrounds the movable armature 211, a biasing member 213, a sealing member 212, a fluid orifice 214, a nozzle 207 at the second end 107, a barb 208 formed on the nozzle 207, first and second coil cores 201A, 201B, and a fluid channel 215 formed in the magnetic core 210 and the movable armature 211. According to an embodiment of the invention, the nozzle 207 is adapted to receive the conduit 105', which has been omitted from FIG. 2. The barb 208 can be adapted to retain the conduit 105' on the nozzle 207. A nozzle is not shown at the first end 106 of the valve 100 in FIG. 2. In this embodiment, the valve 100 may be used as a dispenser or the like and therefore a nozzle may not be necessary or desired.

Figure 3:
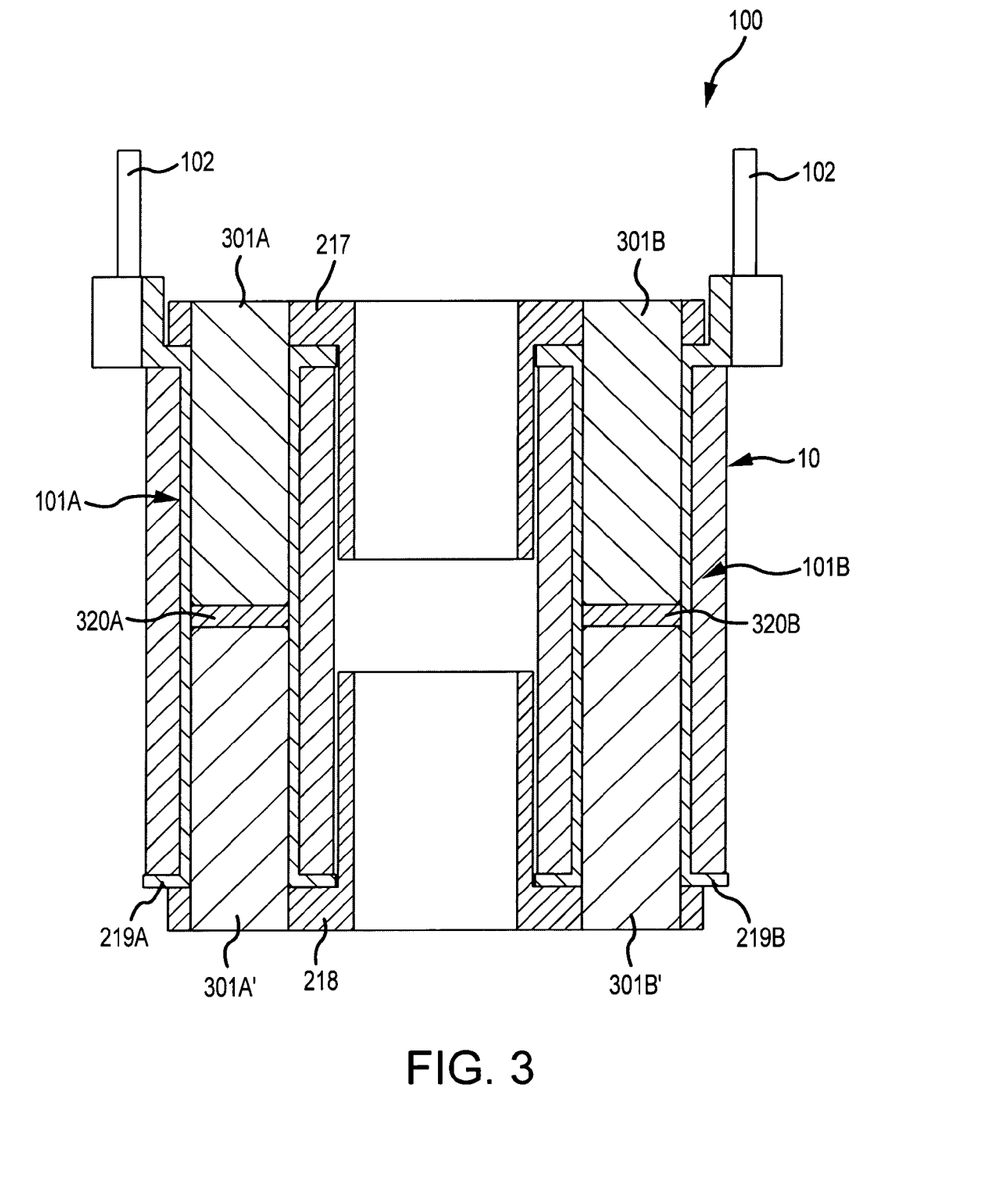
FIG. 3 shows a cross-sectional view of the multiple coil valve according to another embodiment of the invention.

Additionally shown in FIG. 3 are magnetic plates 217, 218. The magnetic plates 217, 218 are located around the magnetic core 210, and the movable armature 211. For example, the magnetic core 210 is surrounded by magnetic plate 217 and the movable armature 211 is surrounded by the magnetic plate 218. According to an embodiment of the invention, the magnetic plates 217, 218 can increase and help direct the magnetic flux created by the coils 101A, 101B. It should be appreciated however, that some embodiments may omit the magnetic plates 217, 218.

According to an embodiment of the invention, the removable cartridge 103 is positioned between the first and second solenoid coils 101A, 101B. It will be clear that a centerline ($C_S$) of the first solenoid coil 101A and a centerline ($C_S$) of the second solenoid coil (101B) are approximately equidistantly offset from a centerline ($C_A$) of the one or more movable armatures (211), as illustrated. The removable cartridge 103 may be coupled to the cartridge receivers 104, for example. The removable cartridge 103 may be coupled to the cartridge receivers 104 in a number of different ways including friction fit, latching arms (not shown), adhesives, etc. The particular method for retaining the removable cartridge 103 is not important for purposes of the present invention and therefore, should not limit the scope of the present invention. It should be appreciated that with the removable cartridge 103 positioned between the first and second solenoid coils 101A, 101B, the movable armature 211 is at least partially positioned between the first and second solenoid coils 101A, 101B. As a result, the gap between the movable armature 211 and the solenoid coils 101A, 101B is reduced to a minimum. Therefore, the movable armature 211 experiences substantially more of the magnetic flux than in the prior art where the movable armature is positioned below the coils and the spacing between the armature and the coils is greatly increased. It should be appreciated that while only one magnetic core 210 and one movable armature 211 is shown, in other embodiments more than one magnetic core or movable armature may be provided. Therefore, the particular number of magnetic cores and movable armatures should not limit the scope of the present invention.

According to an embodiment of the invention, the biasing member 213 may be used to bias the movable armature 211 towards a first position. In the embodiment shown, the first position is away from the magnetic core 210 with the movable armature 211 retaining the sealing member 212 against the orifice 214 in order to close the valve 100. According to an embodiment of the invention, the housing 216 retains the movable armature 211 and also couples the movable armature 211 to the magnetic core 210. The housing 216 can also maintain a fluid tight seal thereby retaining the fluid within the fluid channel 215.

According to an embodiment of the invention, upon energizing the first and second solenoid coils 101A, 101B using the electrical contacts 102, a magnetic flux is produced that acts on the movable armature 211 and overcomes the biasing force provided by the biasing member 213. According to one embodiment, the first and second solenoid coils 101A, 101B may be energized in series. While energizing the solenoid coils 101A, 101B in series, less magnetic flux is produced; however, the coils 101A, 101B operate at a lower temperature. According to another embodiment of the invention, the first and second solenoid coils 101A, 101B may be energized in parallel. According to yet another embodiment of the invention, only one of the coils 101A, 101B may be energized. This may be particularly true in applications where the fluid pressure is relatively low compared to the valve's capabilities.

As the movable armature 211 moves away from the first position and is moved in a second direction, i.e., towards the magnetic core 210, the sealing member 212 no longer seals the orifice 214. Therefore, fluid can flow from the second end 107, through the fluid channel 215, to the first end 106. The housing 216, which is coupled to the magnetic core 210, seals the fluid within the fluid channel 215. In addition, in some embodiments, including the embodiment shown, the housing 216 also forms the orifice 214, thereby minimizing the number of potential leak points.

Because the movable armature 211 is positioned at least partially between the first and second solenoid coils 101A, 101B, a greater surface area of the movable armature 211 is exposed to the magnetic flux created by the solenoid coils 101A, 101B. Therefore, a greater amount of force is experienced by the movable armature 211 than could be realized in the prior art. As a result, the movable armature 211 can be raised a greater distance than could be realized in the prior art. With the movable armature 211 experiencing a greater force, a stronger biasing member 213 may be implemented in the present invention, thereby allowing the valve 100 to handle larger fluid pressures/flow rates. One reason for this increased capability can be appreciated from FIG. 2. As can be seen, the coil cores 201A, 201B have a diameter 220, while the movable armature 211 has a diameter 221, which is greater than the diameter 220. Although the combination of the diameters 220 of the first and second coil cores 201A, 201B may be larger than the diameter 221 of the movable armature 211, a similar configuration in a single coil valve would greatly increase the width, W of the valve 100. It should be appreciated that while "diameter" is used, the coil cores and movable armature may take a number of different shapes and therefore, while diameter is used, it can easily be appreciated that the parameter of interest is the cross-sectional area of the components. The use of "diameter" is only used to aid in the understanding of the present invention. However, it should be appreciated that in some embodiments, the movable armature 211 may comprise a cross-sectional area that is larger than the individual cross-sectional areas of the first and second solenoid coil cores 201A, 201B. In some embodiments, the movable armature 211 may comprise a cross-sectional area that is larger than the individual cross-sectional areas of the first and second solenoid coils 101A, 101B, i.e., the coil cores 201A, 201B as well as the coil windings and any additional insulating material. The increased size of the movable armature 211 was not possible in the prior art single coil valves due to the limited magnetic force produced by a single coil. Therefore, in the prior art, as the valve size decreased, the pressure/flow rate capabilities of the valve also decreased. In contrast, for a given valve width, W, the movable armature 211 of the present invention can be formed larger than in the prior art thereby allowing increased pressure and/or flow rates through the valve 100.

FIG. 3 shows a cross-sectional view of the base portion 10 of the multiple coil valve 100 according to another embodiment of the invention. In the embodiment shown in FIG. 3, the magnetic core 210 and movable armature 211 are removed from the valve 100. In addition to the components shown in FIG. 2, the base portion 10, and more particularly, the coils 101A, 101B include permanent magnets 320A, 320B. According to an embodiment of the invention, the permanent magnets 320A, 320B can be utilized to latch the movable armature 211 in a desired position. According to an embodiment of the invention, the permanent magnets 320A, 320B are positioned between coil core sections. For example, with respect to the first coil 101A, the coil core is divided between a first coil core section 301A and a second coil core section 301A'. Similarly, the permanent magnet 320B divides the second coil 101B into a first coil core section 301B and a second coil core section 301B'. Advantageously, the permanent magnets 320A, 320B are separated from the fluid channel 215, therefore the chance of fluid contacting the permanent magnets 320A, 320B and causing corrosion is substantially decreased compared to prior art designs that separate the magnets from the fluid by only a single seal that can easily fail and leak.

In use, the valve 100 according to the embodiment shown in FIG. 3 may be used to retain the movable armature 211 in a specific valve position. For example, the coils 101A, 101B may be energized with a first current polarity to move the movable armature 211 from a first position to a second position, as described above. However, upon de-energizing the coils 101A, 101B, the biasing member 213 does not return the movable armature 211 to the first position as in the previous embodiments. In contrast, the permanent magnets 320A, 320B retain the movable armature 211 in the second position. Therefore, the permanent magnets 320A, 320B allow the movable armature 211 to retain its position without requiring continuous energy supplied to the coils 101A, 101B. Advantageously, energy can be saved when operating the valve 100.

According to an embodiment of the invention, the movable armature 211 can be returned to the first position by reversing the polarity of the current flowing through the coils 101A, 101B. As is generally known in the art, by reversing the current polarity, the direction of the magnetic flux reverses direction, thereby biasing the movable armature 211 in the second direction. Therefore, by energizing the coils 101A, 101B with a second current polarity that is opposite to the first current polarity used when first energizing the coils 101A, 101B, the movable armature 211 is returned to the second position where the poppet 212 can once again seal the orifice 214.

In some embodiments, the first solenoid coil 101A may be energized with a first current polarity to move the movable armature 211 from the first position to the second position. Upon de-energizing the first solenoid coil 101A, the permanent magnets 320A, 320B can retain the movable armature 211. In order to return the movable armature 211 back to the first position, the second solenoid coil 101B may be energized with a second current polarity that is substantially opposite the first current polarity. Therefore, the solenoid coils 101A, 101B may be used independently in order to move the movable armature 211 in a specific direction.

Because the permanent magnets 320A, 320B retain the movable armature 211 and require energizing the coils 101A, 101B to move the armature 211 in either direction, according to an embodiment of the invention, when the valve 100 includes permanent magnets 320A, 320B, the biasing member 213 may be omitted. However, it should be appreciated that the biasing member 213 does not have to be omitted and some embodiments include the permanent magnets 320A, 320B, as well as the biasing member 213.

Figure 4:
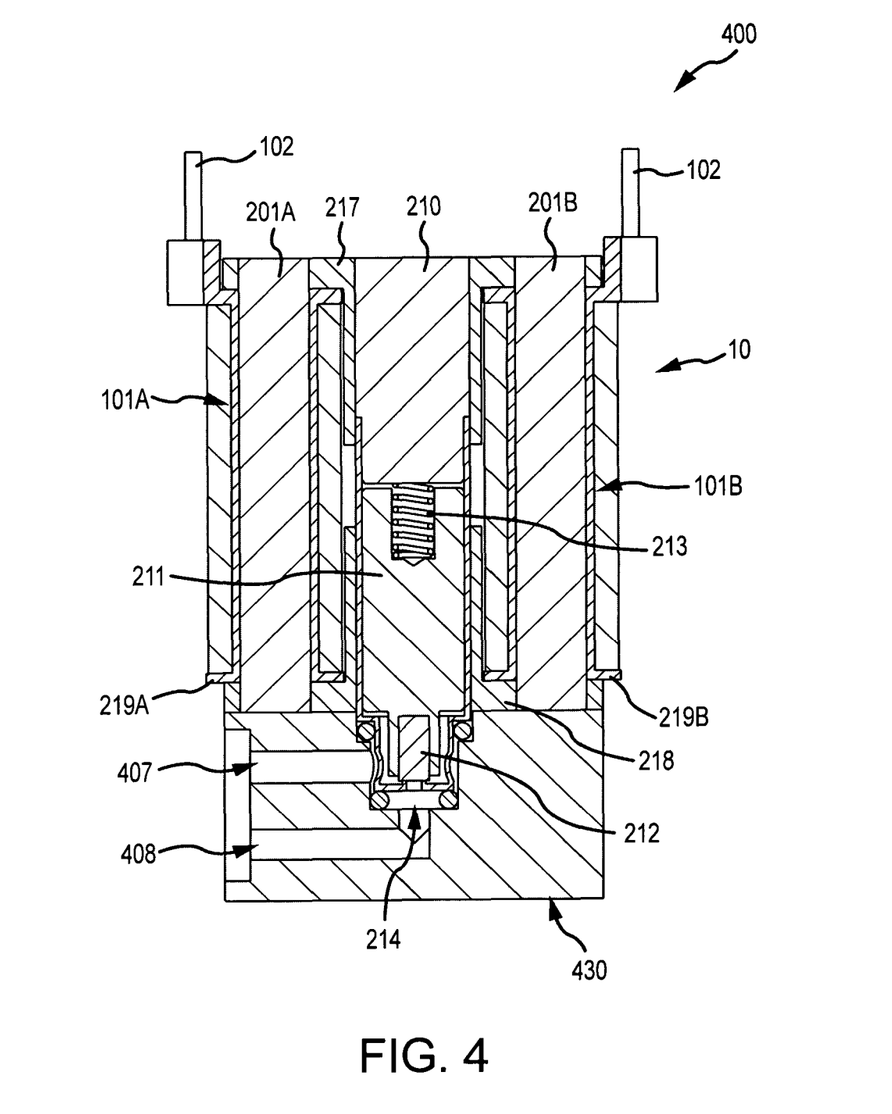
FIG. 4 shows a cross-sectional view of the multiple coil valve according to yet another embodiment of the invention.

FIG. 4 shows a cross-sectional view of a multiple coil valve 400 according to an embodiment of the invention. The valve 400 shown in FIG. 4 is similar to the valve 100 shown in the previous embodiments. However, the valve 400 does not include the removable cartridge 103. Rather, the magnetic core 210 and movable armature 211 comprise substantially permanent components of the valve 400. In some embodiments, the first and second solenoid coils 101A, 101B may be coupled together using the magnetic core 210 rather than the cartridge receivers 104. In addition, rather than forming the fluid flow path 215 through the magnetic core 210 and the movable armature 211, the fluid flow path is formed in a body 430. According to an embodiment of the invention, the body 430 is coupled to the base portion 10. The body 430 may be removably coupled to the base portion 10 or substantially permanently coupled to the base portion 10. The particular method of coupling the base portion 430 to the body 10 is not important for purposes of the present invention and therefore, should not limit the scope of the present invention. In addition, the valve 400 does not include a removable portion as in the valve 100. As can be seen, the body 430 includes a fluid inlet 407 and a fluid outlet 408. It should be appreciated that as described above, the fluid inlet 407 and fluid outlet 408 may be reversed. In the position shown in FIG. 4, the sealing member 212 seals the orifice 214 such that the fluid inlet 407 and fluid outlet 408 cannot communicate with one another. Upon actuating the valve 400, the movable armature 211 can be raised to allow fluid to flow from the fluid inlet 407 to the fluid outlet 408 as discussed above. Although the fluid path is limited to the body 430 in the valve 400, the movable armature 211 is still positioned at least partially between the first and second coils 101A, 101B. As a result, the magnetic flux generated by the first and second coils 101A, 101B is still optimized. Therefore, the valve 400 is capable of operating at higher fluid pressures/flow rates than could be realized by a prior art valve with a substantially similar cross sectional width.

Figure 5:
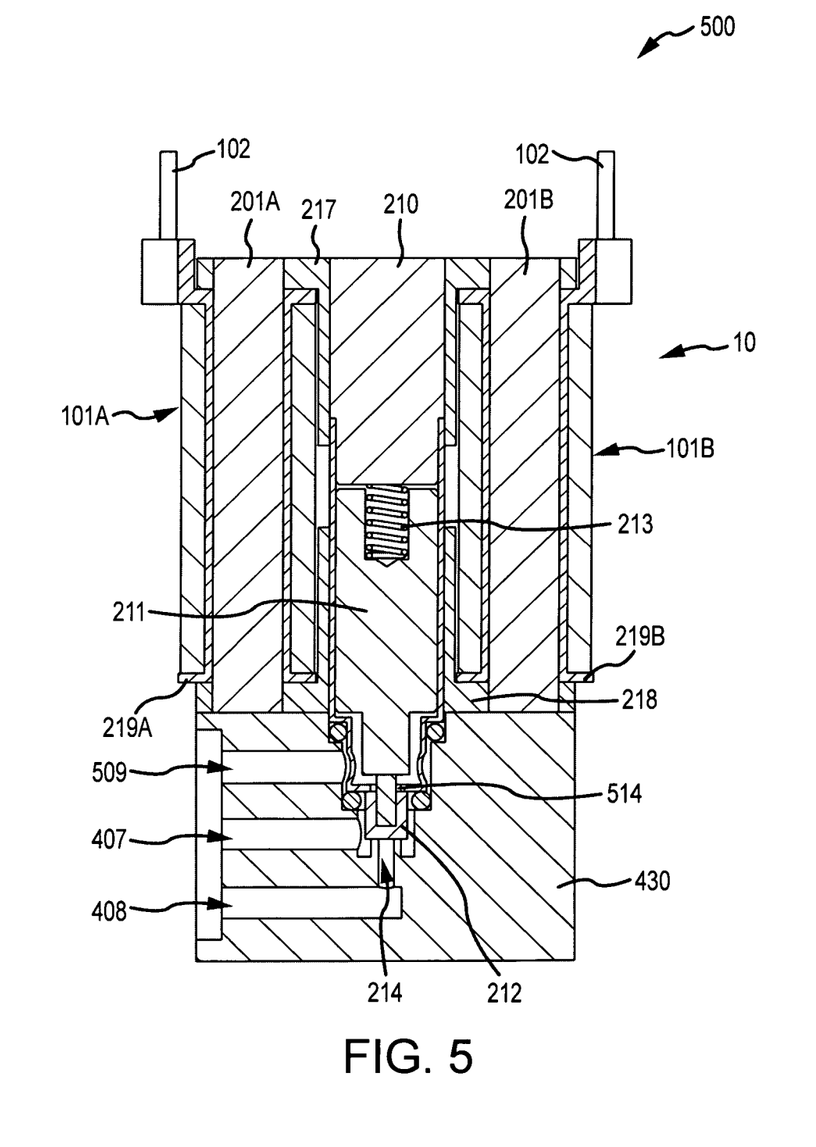
FIG. 5 shows a cross-sectional view of the multiple coil valve according to yet another embodiment of the invention.

FIG. 5 shows a multiple coil valve 500 according to yet another embodiment of the invention. The multiple coil valve 500 is similar to the multiple coil valve 400, except that the multiple coil valve 500 comprises a 3/2 valve. In addition to the first and second fluid ports 407, 408 included in the valve 400, the valve 500 also includes a third fluid port 509. According to an embodiment of the invention, the valve 500 may be configured to bias the movable armature 211 in a first direction in order to seal the second fluid port 408. As a result, when the solenoid coils 101A, 101B are not energized, the first fluid port 407 is in communication with the third fluid port 509. Upon energizing the first and second coils 101A, 101B, a magnetic flux is generated that acts on the movable armature 211 to overcome the biasing force of the biasing member 213; the movable armature 211 then moves in the second direction towards the magnetic core 210. When the movable armature 211 moves in the second direction, the seal between the sealing member 212 and the orifice 214 is broken and the sealing member 212 forms a new seal with the second orifice 514 to seal off the third fluid port 509. Upon de-energizing the solenoid coils 101A, 101B, the biasing member 213 biases the movable armature 211 back to the first position.

It should be appreciated that the embodiments described above are merely examples of various implementations that can be used in combination with a multiple coil solenoid valve according to the present invention. For example, the multiple coil solenoid valve may be combined with a needle to be used with drug delivery into humans and animals. In other embodiments, more than one multiple coil valves may be provided in an in-line manifold, for example. In each embodiment however, the movable armature 211 can be positioned at least partially between a first and a second solenoid coil 101A, 101B in order to decrease the spacing between the solenoid coils 101A, 101B and the movable armature 211 so as to maximize the magnetic flux experienced by the movable armature 211.

It should also be appreciated that the various embodiments described above may be combined with one another. For example, the embodiment shown in FIG. 4 that includes a body 430 without a removable cartridge 103 may include the permanent magnets 320A, 320B described in FIG. 3. Therefore, the particular embodiments described should not be limited solely to the features discussed above.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valves, and not just to the embodiments described above and shown in the accompanying figures. Accordingly, the scope of the invention should be determined from the following claims.

We claim:

1. A multiple coil solenoid valve (100), comprising:
   one or more movable armatures (211) movable between a first position and at least a second position;
   a first solenoid coil (101A) adjacent to the one or more movable armatures (211);
   at least a second solenoid coil (101B) adjacent to the one or more movable armatures (211), wherein the one or more movable armatures (211) are positioned at least partially between the first and second solenoid coils (101A, 101B), and wherein a centerline of the first solenoid coil (101A) and a centerline of the second solenoid coil (101B) are approximately equidistantly offset from a centerline of the one or more movable armatures (211);
   one or more magnetic cores (210) positioned at least partially between the first and second solenoid coils (101A, 101B), wherein each of the first and second solenoid coils (101A, 101B) comprise a first cross-sectional area and the one or more movable armatures (211) comprises a second cross-sectional area, wherein the second cross-sectional area is larger than the first cross-sectional area of the first solenoid coil (101A), and the second cross-sectional area is larger than the first cross-sectional area of the second solenoid coil (101B); and
   a removable cartridge (103), wherein the one or more magnetic cores (210) and the one or more movable armatures (211) are located within the removable cartridge (103), and wherein the removable cartridge (103) is removable independently from the first coil (101A) and the second coil (101B).

2. The multiple coil solenoid valve (100) of claim 1, further comprising a sealing member (212) and a fluid orifice (214).

3. The multiple coil solenoid valve (100) of claim 1, further comprising a fluid flow path (215) formed in the one or more magnetic cores (210) and in a bore defined by the one or more movable armatures (211).

4. The multiple coil solenoid valve (100) of claim 1, further comprising one or more permanent magnets (320A, 320B) located in at least one of the first or second solenoid coils (101A, 101B), wherein the one or more permanent magnets divide the at least one of the first or second solenoid coils into a first coil core section and a second coil core section.

5. The multiple coil solenoid valve (100) of claim 1, further comprising a body (430) coupled to the first and second solenoid coils (101A, 101B) and including a first fluid port (407) and at least a second fluid port (408).

6. The multiple coil solenoid valve (100) of claim 5, further comprising a third fluid port (509) formed in the body (430).

7. A method for forming a multiple coil solenoid valve including a first solenoid coil and at least a second solenoid coil, comprising the steps of:
   positioning one or more magnetic cores at least partially between the first and second solenoid coils, wherein a centerline of the first solenoid coil and a centerline of the second solenoid coil are approximately equidistantly offset from a centerline of the one or more movable armatures; and
   positioning one or more movable armatures at least partially between the first and second solenoid coils, wherein each of the first and second solenoid coils comprise a first cross-sectional area and each of the one or more movable armatures comprises a second cross-sectional area, wherein the second cross-sectional area is larger than the first cross-sectional area of the first solenoid coil, and the second cross-sectional area is larger than the first cross-sectional area of the second solenoid coil; and
   wherein the one or more magnetic cores and the one or more movable armatures are located within a removable cartridge, wherein the removable cartridge is removable independently from the first coil and the second coil.

8. The method of claim 7, further comprising the step of coupling a sealing member to the one or more movable armatures, with the sealing member being adapted to seal an orifice of the multiple coil solenoid valve.

9. The method of claim 7, further comprising the step of forming a fluid flow path in the one or more magnetic cores and through a bore defined by the one or more movable armatures.

10. The method of claim 7, further comprising the step of positioning one or more permanent magnets in at least one of the first or second solenoid coils, wherein the one or more permanent magnets divide the at least one of the first or second solenoid coils into a first coil core section and a second coil core section.

11. The method of claim 7, further comprising the step of coupling a body to the first and second solenoid coils, wherein the body includes a first fluid port and at least a second fluid port.

* * * * *